Patented Nov. 24, 1936

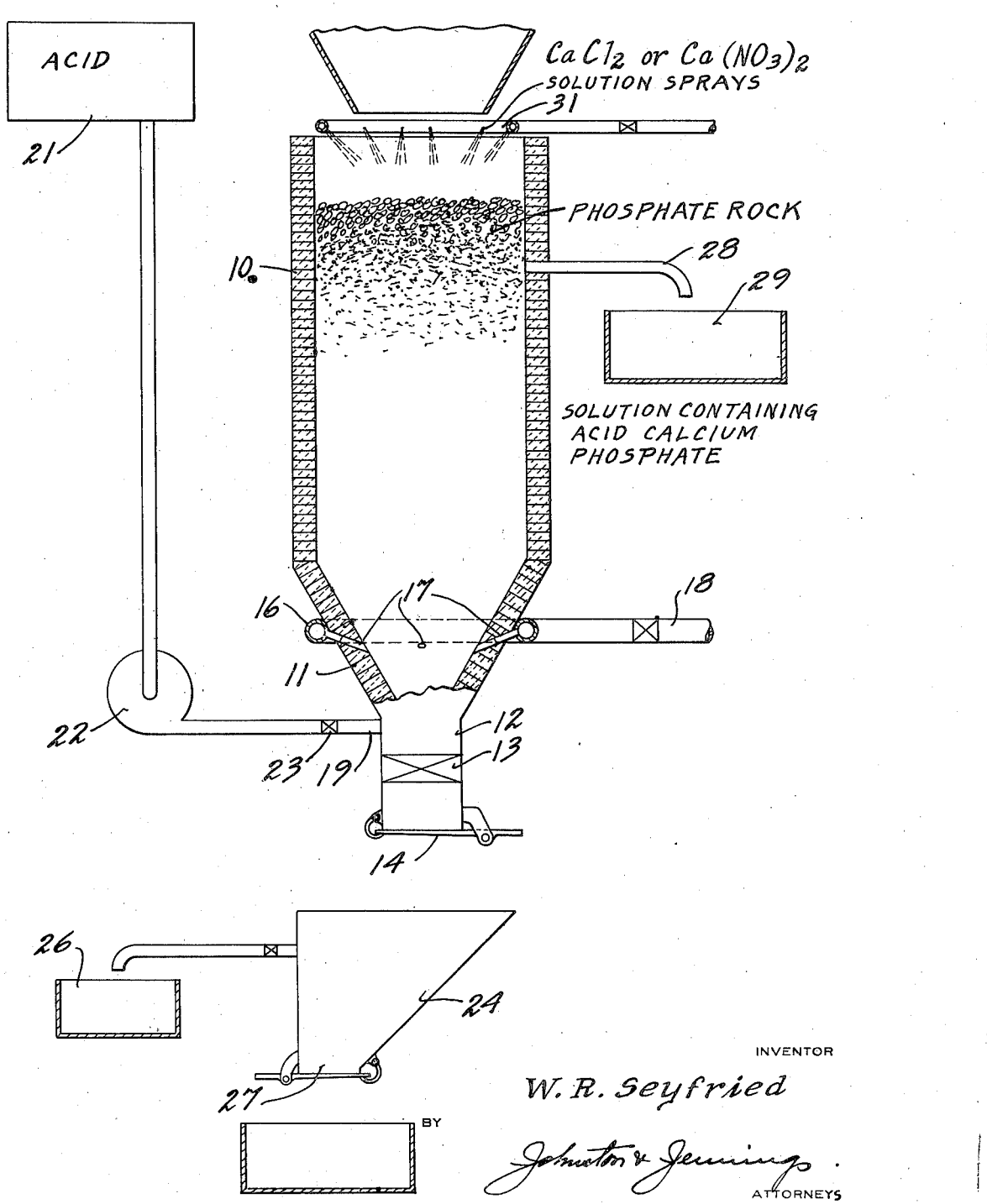

2,061,639

UNITED STATES PATENT OFFICE 2,061,639

DIGESTING PHOSPHATE ROCK

Warren R. Seyfried, Birmingham, Ala.

Application December 12, 1934, Serial No. 757,101

4 Claims. (Cl. 23—109)

This invention relates to the digesting of tricalcic phosphate, or phosphate rock, with acid to release acid calcium phosphate and fix the remaining calcium content of the rock in the form of a salt of the acid employed in the process, and has for an object the provision of such a process in which unground, undried phosphate rock may be treated and the process carried on continuously as distinguished from a batch conversion method.

A further object of my invention is to provide a method for digesting phosphate rock in which the major portion of the fluorine content of the rock shall be fixed in an insoluble form whereby it is readily separated out from the acid calcium phosphate solution resulting from the acid treatment.

In my prior Patent No. 1,969,951, issued August 14, 1934, there is described and claimed a process for digesting phosphate rock utilizing a volatile acid gas which is hydrated and dissolved in an absorption tower on the surface of the rock, and a solution containing acid calcium phosphate recovered at the bottom of the tower. The process herein disclosed is similar to that disclosed in my prior patent, in that unground, undried phosphate rock may be, and preferably is, employed, but departs from the process of my prior patent in that I employ acid in a liquid form, passing it upwardly through the bed of rock where it acts to release acid calcium phosphate and form a soluble calcium compound with the remaining calcium content of the rock, and in which the acid insolubles contained in the rock settle out and are removed from the bottom of the tower, the solution containing acid calcium phosphate and other soluble salts overflowing from the upper part of the tower into a suitable receiving vessel where it may be further treated to form other phosphates or to recover phosphoric acid, as is well understood.

As is well known, phosphate rock has a considerable fluorine content which exerts a toxic effect in the recovered phosphoric acid or phosphate salts unless removed during processing, and considerable effort has been put forth by persons skilled in this art, to devise economical means for ridding the recovered products of fluorine compounds. For example, in digesting phosphate rock with hydrochloric acid, or nitric acid, the fluorine content of the rock, is to a very considerable extent reacted upon by the acid to form soluble hydrogen fluoride and a calcium salt of the acid being employed. The soluble hydrogen fluoride goes on into the solution of acid calcium phosphate and is difficult and expensive to separate therefrom.

I have discovered that if an excess of the calcium salt of the acid employed in digesting is present with the acid acting on the rock, the formation of soluble hydrogen fluoride is either repressed, or else as soon as it is formed, it reacts with the calcium salt to form insoluble calcium fluoride. Whatever the mechanics of the reaction taking place may be, I have found that the major portion of the fluorine content of the rock may be precipitated in the manner outlined as insoluble calcium fluoride in the step of digesting the rock.

To better illustrate the reactions which may occur, in the digesting of phosphate rock with hydrochloric acid the following reactions may occur:

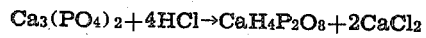
$$Ca_3(PO_4)_2 + 4HCl \rightarrow CaH_4P_2O_8 + 2CaCl_2$$

The fluorine content of the rock, which, for the purpose of illustration is assumed to be in the form of $CaF_2$ may be reacted upon by the acid in the following manner:

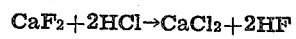
$$CaF_2 + 2HCl \rightarrow CaCl_2 + 2HF$$

I have found that if there be an excess of calcium chloride present with the acid, at any point in the process over that normally resulting from the reaction, the hydrogen fluoride released reacts with the excess of calcium chloride present, to form insoluble calcium fluoride, that is:

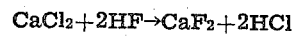
$$CaCl_2 + 2HF \rightarrow CaF_2 + 2HCl$$

It is evident that an excess of calcium chloride present either represses the formation of hydrogen fluoride, or else reacts with the hydrogen fluoride immediately to convert it into insoluble calcium fluoride.

A similar result is obtained when employing nitric acid to digest the rock, if an excess of calcium nitrate $Ca(NO_3)_2$ is present

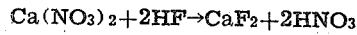
$$Ca(NO_3)_2 + 2HF \rightarrow CaF_2 + 2HNO_3$$

When utilizing either hydrochloric or nitric acid, the agent employed to repress the formation of soluble fluorine compounds is a byproduct of the reaction with phosphate rock and introduces no additional cost.

Where hydrochloric acid is employed as the acid for digesting rock, the concentration can vary over rather wide limits. Calcium chloride is soluble in hydrochloric acid in ratios as high as 1 HCl to 7.35 $CaCl_2$. Any ratio of HCl to $CaCl_2$ of from 0.6 to 2.0 would be practical, although the actual ratio wou'd necessarily depend upon the size of tower, weather conditions, and other factors. Under average conditions of operation, a concentration of around 20% HCl is recommended.

Calcium nitrate is soluble in nitric acid in ratios up to one part acid to 4.25 parts of $Ca(NO_3)_2$. I have found that any ratio of $HNO_3$ to $Ca(NO_3)_2$ of from .5 to 1, to 2 to 1, is practical for inhibiting the formation of soluble fluorine compounds. Since $Ca(NO_3)_2$ is an excellent fertilizer material, and since its solution may be evaporated down and the calcium nitrate recovered, its recirculation with nitric acid in the digestion process has the dual advantage of repressing the formation of soluble fluorine compounds, as well as providing a more concentrated calcium nitrate solution, the heat of the reaction with the phosphate rock serving to evaporate a considerable part of the water in the calcium nitrate solution.

In digesting phosphate rock with acid, a serious problem heretofore present has been the control of foam formation due to the presence of $CO_2$ in the phosphate rock. This difficulty is overcome in accordance with my improved process by maintaining the level of the rock in the tower above the offtake for the solution. By this means the foam, as it is formed, is broken up by passage through the interstices of the rock. If additional control means is required sprays of calcium chloride or calcium nitrate solution on the upper surface of the stock may be employed.

The accompanying drawing illustrates more particularly the manner in which my improved process is carried out.

Referring to the drawing, I provide a tower 10 made of acid resistant material, such as brick or carbon blocks. The bottom portion of the tower 11 converges to a bottom outlet 12 for insolubles which may be controlled by a gate valve 13. Also a quick closing door 14 may be provided at the bottom of the outlet 12. Surrounding the converging portion 11 of the tower is a manifold 16 which opens into the tower in the form of downwardly directed jets or nozzles 17. A conduit 18 connected to the manifold supplies water under pressure for washing out insolubles from the bottom of the tower, by means of the nozzles 17, as the insolubles accumulate.

Connected to the bottom outlet 12, just above the gate valve 13, is a conduit 19 for supplying acid to the tower. Preferably the acid is supplied from an elevated container 21 and flows by gravity through the conduit 19 and upwardly through the tower. A pump 22 may be interposed in the conduit 19 and a valve 23 is provided to cut off the supply of acid when desired.

When insoluble material is discharged from the bottom of the tower, it is discharged into a vessel 24 and the acid and wash water discharged with the insolubles recovered in a vessel 26 from whence it may be returned to the acid tank 21. The insoluble material is finally discharged from the vessel 24 at 27 and may go to waste or to a reclassifier.

In operation, the tower 10 is charged with unground, undried phosphate rock, the rock being fed in continuously so as to maintain a substantially constant level, as the lower portion of the descending charge is digested. Acid, preferably diluted, as heretofore set forth, is introduced through the conduit 19 to flow upwardly through the rock, overflowing from the upper part of the tower a substantial distance below the upper level of the stock, through a conduit 28 into a vessel 29, from whence the solution is further treated for the recovery of phosphates or phosphoric acid, as is well understood in the art. The upper level of the descending charge will depend upon the grade and sizing of the rock, but should be maintained at such a point as largely to break up foam as it is formed. The rate of flow of the acid through the tower and the time for reaction should be so controlled and adjusted that the free acidity of the resulting solution will not exceed from 2 to 4%. As the rock is digested, the insoluble content gradually settles down to the bottom of the tower and is removed periodically, as heretofore explained. The upward travel of the liquid acid through the tower exerts a buoyant effect upon the rock and maintains the mass in a loose, pervious condition whereby the maximum contact of the acid with the rock is obtained. As heretofore explained, spray means 31 for calcium chloride or calcium nitrate solution may be employed on the upper surface of the descending charge to control foam formation.

While I have described several ways of carrying out my invention, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. The method of digesting phosphate rock which comprises passing liquid hydrochloric acid upwardly through a confined mass of unground phosphate rock, causing the resulting solution containing calcium phosphate and calcium chloride to overflow from the upper part of the mass, recirculating calcium chloride solution with the hydrochloric acid through the mass, periodically removing insoluble matter from the bottom of the mass, and supplying unground rock to the top of the mass to replace that reacted upon by the acid.

2. The method of digesting phosphate rock which comprises passing liquid nitric acid upwardly through a confined mass of unground phosphate rock, causing the resulting solution containing calcium phosphate and calcium nitrate to overflow from the upper part of the mass, recirculating calcium nitrate with the nitric acid through the mass, periodically removing insoluble materal from the bottom of the mass, and supplying unground rock to the top of the mass to replace that reacted upon by the acid.

3. The method of digesting phosphate rock comprising continuously feeding unground rock downwardly through a confined zone, passing liquid hydrochloric acid under pressure diluted up to 80% with calcium chloride solution upwardly through the mass, causing the resulting solution to overflow from the upper part of the mass, adjusting the rate of flow through the rock so that the free acidity of the resulting solution does not exceed 4%, and periodically removing insoluble material from the bottom of the confined zone.

4. The method of digesting phosphate rock which comprises leaching a mass of the rock in countercurrent flow relation with an acid effective to form therewith a soluble calcium compound and acid calcium phosphate, and in the presence of an excess of said soluble calcium compound over that formed by reaction of the rock with the acid, and spraying the upper surface of the mass with said soluble calcium compound to control foam formation.

WARREN R. SEYFRIED.